United States Patent [19]

Kelley et al.

[11] 3,949,402

[45] Apr. 6, 1976

[54] ANALOG AND DIGITAL RECORDING APPARATUS

[75] Inventors: Thomas P. Kelley, Cornwells Heights; Charles E. Lane, III, Meadowbrook, both of Pa.

[73] Assignee: Honeywell Inc., Minneapolis, Minn.

[22] Filed: Feb. 3, 1975

[21] Appl. No.: 546,322

Related U.S. Application Data

[63] Continuation of Ser. No. 417,625, Nov. 20, 1973, abandoned.

[52] U.S. Cl. .................. 346/61; 346/76 R; 346/79
[51] Int. Cl.² .................. G01D 9/28; G01D 15/10
[58] Field of Search ............. 346/76 R, 79, 136, 61, 346/59; 197/1 R; 101/93.04; 178/23

[56] References Cited
UNITED STATES PATENTS

| | | | |
|---|---|---|---|
| 2,950,159 | 8/1960 | McCulley | 346/59 |
| 3,476,877 | 11/1969 | Perkins et al. | 178/23 |
| 3,605,110 | 9/1971 | Southward | 346/59 X |
| 3,754,278 | 8/1973 | Borden | 346/76 R |
| 3,754,279 | 8/1973 | Valenti et al. | 346/76 R |
| 3,757,350 | 9/1973 | Filegner et al. | 346/76 R X |

*Primary Examiner*—Joseph W. Hartary
*Attorney, Agent, or Firm*—Laurence J. Marhoefer; Lockwood D. Burton; Mitchell J. Halista

[57] ABSTRACT

A thermal recorder having an analog recording stylus and a digital recording head uses a stepping drive means for intermittently driving a thermally responsive recording medium past the analog recording stylus and digital recording head. The analog recording stylus is maintained in contact with the intermittently driven recording medium which the digital recording head is mounted on one end of a pivoted support arm. A solenoid is connected to the other end of the support arm and is selectively energized to bring the digital recording head into contact with the recording medium during the interval between the stepped movements of the recording medium when the recording medium is at rest.

7 Claims, 3 Drawing Figures

ANALOG AND DIGITAL RECORDING APPARATUS

This is a continuation of application Ser. No. 417,625 filed on Nov. 20, 1973 and now abandoned.

BACKGROUND OF THE INVENTION

1. Field of the Invention

The present invention relates to recorders. More specifically, the present invention is directed to thermal recorders having analog and digital recording heads for concurrently producing an analog and a digital recording on a thermally responsive recording medium. Thermal recorders may be found in Class 346, subclass 76 R of the United States Patent Office classification system.

SUMMARY OF THE INVENTION

An object of the present invention is to provide an improved recorder for concurrently producing analog and digital recordings on an intermittently moving recording medium.

In accomplishing this and other objects, there has been provided, in accordance with the present invention, a recorder having a digital print head having selectively energizable means for producing a digital character representative recording medium energizing pattern, print means responsive to an input signal and an energized signal for selectively energizing the selectively energizable means in the print head, motor means for incrementally advancing the recording medium, and control means connected to the print means, and the motor means to energize the print means between energizations of the motor means.

BRIEF DESCRIPTION OF THE DRAWING

A better understanding of the present invention may be had from the following detailed description when read in connection with the accompanying drawings, in which.

DESCRIPTION OF THE PREFERRED EMBODIMENT DETAILED DESCRIPTION

Figure 1:
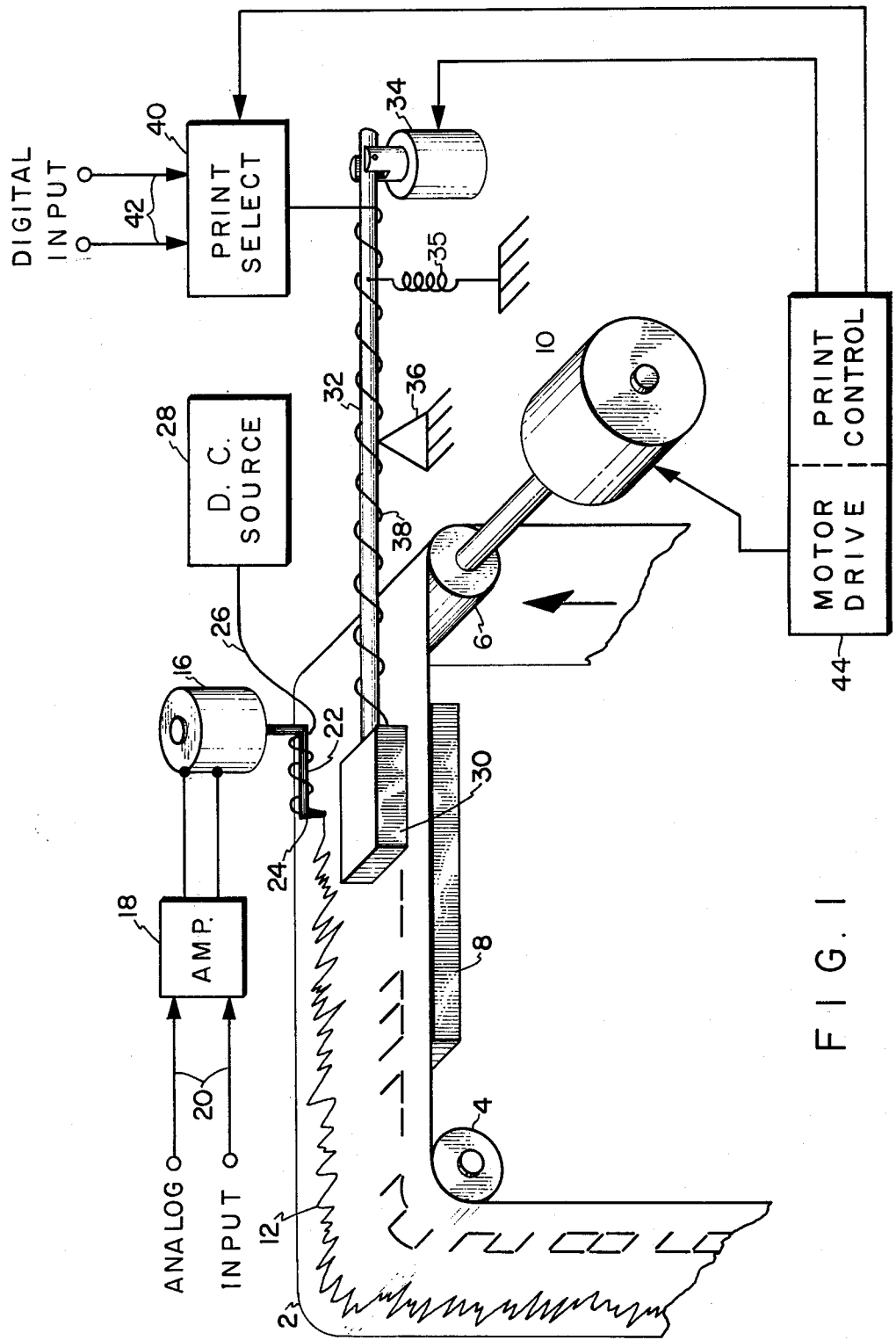
FIG. 1 is a pictorial diagram of a recording system embodying the present invention.

Referring to FIG. 1 in more detail, there is shown a pictorial diagram of a recording system emboyding the present invention in an embodiment for recording on a thermally responsive recording medium 2. The recording medium 2 is supported on a pair of rollers 4 and 6 and a backing plate 8 located intermediate the rollers 4 and 6. One of the support rollers, i.e., support roller 6, is arranged to be rotated by a stepping motor 10 to drive the recording medium 2 in the direction of the arrow. An analog recording 12 and a digital recording 14 are shown being recorded on the recording medium 2 in adjacent and parallel recording tracks extending longitudinally along the recording medium 2. The analog recording may be produced by any suitable analog recording apparatus such as a galvanometer type recording device using a galvanometer movement 16 arranged to be energized by an output signal from an amplifier 18 having an input 20 connected to a source of an analog input signal. The galvanometer movement 16 is arranged to drive an arm 22 connected to a heat producing stylus 24 in contact with the recording medium 2. The stylus 24 is connected by an electrically conductive cable 26 mounted on the arm 22 and connected to a direct current energizing source 28. Another suitable analog recording apparatus for use with the present invention is shown in the U.S. Pat. No. 3,735,417 of Emil A. Holzhauser.

A digital thermal recording head 30 is positioned above the digital recording track on the recording medium 2 and is mounted on one end of a support arm 32. The other end of the support arm 32 is connected to a movable armature of a solenoid 34 and a return spring 35. A pivot 36 is connected to the support arm 32 intermediate the digital recording head 30 and the solenoid 34. The digital print head 30 is connected by an electrically conductive cable 38 mounted on the arm 32 to a print select circuit 40 having an input 42 connected to a source of a digital input signal. The digital print head 30 may be any suitable thermal print head capable of producing a selected pattern of heat emitting sources suitable for activating the thermally responsive medium 2, such devices being well-known in the art. A motor drive and print control circuit 44 is used to supply energizing signals to the motor 10, the solenoid 34 and the print select circuit 40.

MODE OF THE OPERATION

In operation, the circuit shown in FIG. 1 is arranged to produce a concurrent analog and digital recording on the recording medium 2. In order to provide for a clear recording of the information on the recording medium 2, the recording medium 2 is intermittently driven by the stepping motor 10 and the digital recording head 30 is brought into contact with the recording medium 2 by the solenoid 34 during the time that the recording medium 2 is at rest, i.e., between drive steps of the stepping motor 10. During the time that the recording head 30 is in contact with the recording medium 2, the print select circuit 40 is energized to produce an energization of the desired thermal elements in the digital head 30.

Figure 3:
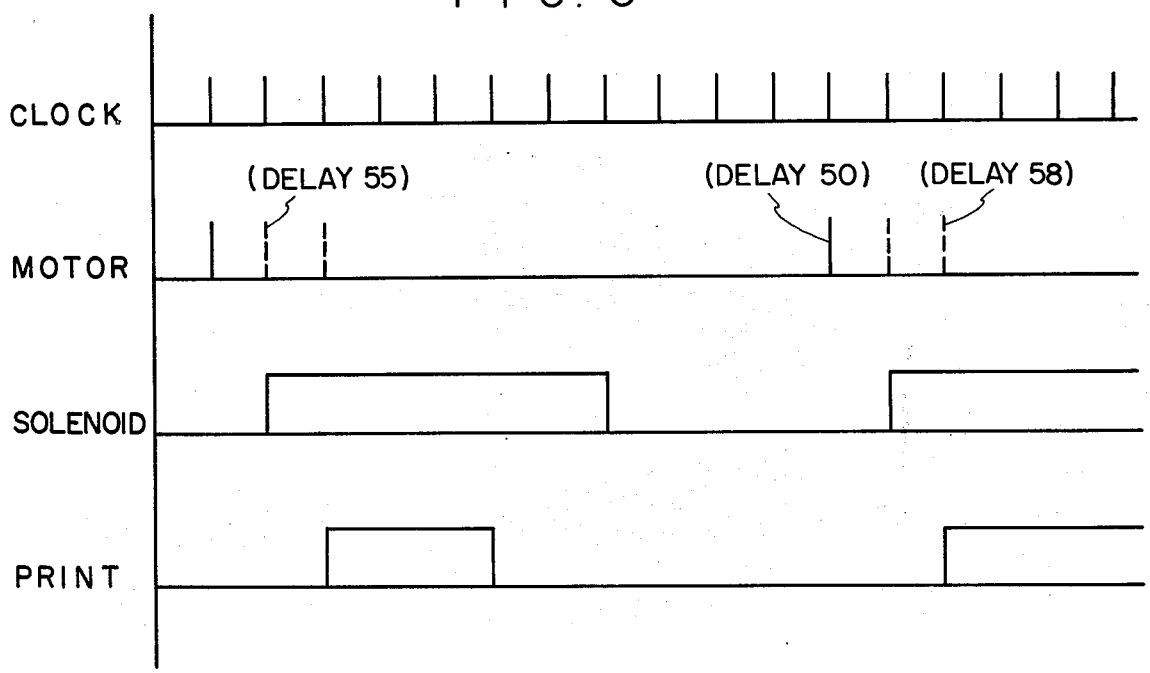
FIG. 3 is a waveshape diagram illustrating the operation of the system shown in FIG. 1.

The analog recording apparatus including the galvanometer movement 16, on the other hand, is continuously energized by the analog input signal and the direct current source 28 to produce a continuous analog recording. The steps of recording medium movement produced by the stepping motor 10 are maintained at a small incremental length of the recording medium 2, e.g., 0.001 of an inch and the stepping frequency of the stepping motor 10 maintained at a frequency conpatible the rate of change of the analog input signal, e.g., 24 steps per second. Under such operating conditions, the analog recording trace 12 is a substantially continuous recording trace while the digital recording 14 is produced during the interval between the steps of the stepping motor 10. In order for the recording medium 2 to respond to the thermal pattern produced by the digital recording head 30, the solenoid 34 is arranged to bring the digital recording head 30 into firm contact with the recording medium 2 during this interval whereby the recording medium 2 is pressed against the backing place 8 and the print select circuit 40 is subsequently energized to effect the thermal recording. Before the occurrence of the next step of the stepping motor 10, the solenoid 34 is de-energized and the digital recording head is withdrawn from contact with the recording medium 2 by the spring 35. This digital print-cycle is repeated for each digital printing operation. A waveshape diagram of the signals occurring during the digital print cycle is shown in FIG. 3. As shown in this diagram, the stepping motor energizing pulses are derived from a clock signal having a higher frequency than the desired motor energizing pulse frequency. The solenoid pulse occurs between motor signals while the print signal is applied during the solenoid signal. Other energizing sequences of the drive signal to the motor 10, the solenoid 34 and the print select circuit 40 may be used without departing from the scope of the present invention. For example, the print select circuit 40 and the solenoid 34 may be energized for a predetermined number of recording medium steps produced by the motor 10. Conversely, if the digital print head 30 is a multi-character print head with the plurality of selectively energizable characters arranged in a side-by-side relationship, each character may be printed separately by consecutive energizing signals applied to the print select circuit 40 during one or more of the solenoid operating signals.

Figure 2:
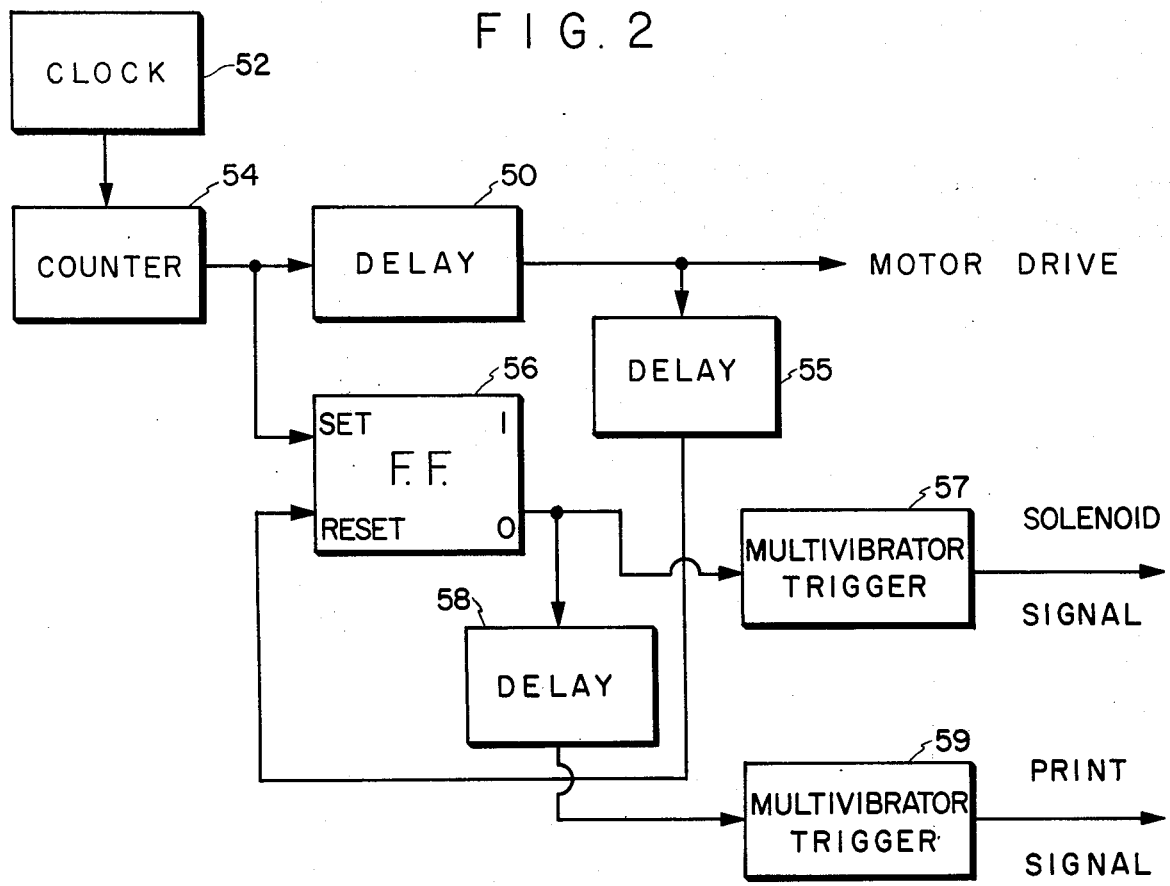
FIG. 2 is a block diagram of a print control circuit suitable for use with the system shown in FIG. 1

In FIG. 2, there is shown a circuit for ensuring that the print select circuit 40 is operated between drive, or energizing, signals to the stepping motor 10. This circuit, accordingly, prevents the printing operation of the digital head 30 until a motor drive cycle has been completed. Specifically, a motor drive cycle has been completed. Specifically, a motor energizing signal is delayed by a first delay circuit 50. The motor energizing signal is derived from a clock circuit 52 and a counter 54 arranged to divide the frequency of the signal from the clock circuit 52 to the desired frequency of the motor energizing signals. The delay circuit 50 may be any suitable device, e.g., a shift register. The motor energizing signal is also arranged to "set" a flip flop circuit 56. The output of the delay circuit 50 is connected to the motor 10 and through a second delay circuit 55 to a "reset" input of the flip flop 56. The 0, or reset, output of the flip flop 56 is connected to the input of a first multivibrator trigger circuit 57 having an output connected to the solenoid circuit 34 and through a third delay circuit 58 to the input of a second multivibrator trigger circuit 59. The output of the second multivibrator trigger circuit 59 is connected to the print select circuit 40 to apply an energizing signal thereto. The first and second multivibrators 57 and 59 may be any suitable astable multivibrator circuit capable of triggering on a predetermined change in an input signal supplied thereto, e.g., positive to negative, to produce an output signal having a preselected duration, such devices being well-known in the art. Further, while the following discussion is directed to a simplification of the digital print cycle wherein each motor step precedes a corresponding digital print cycle, it may be desirable to limit the print cycle to occur following a plurality of motor steps, e.g., 100 steps. For such an operation, a counter would interposed between the output of the first delay 50 and the input of the second delay 55 whereby a counter output signal is applied to the input of the second delay 55 for a predetermined number of motor energization signals from the first delay 50.

The motor energizing signal at the output of the delay circuit 50 is effective to reset the flip flop 56 after the delay interval produced by the second delay circuit 55 to produce a 0 signal from the flip-flop 56 capable of energizing the print select circuit 40 and the solenoid 34. The inherent signal delays in the energization of these circuit elements may also be used to assure that the recording medium 2 has reached a stationary state following the operation of the motor 10. On the other hand, additional delay circuits may be introduced into the signal paths to provide the proper timing of the digital print cycle with respect to the operation of the stepping motor 10. The output signal from the first delay 50 is applied to the drive motor 10 whereby the motor 10 is driven through one incremental step to correspondingly advance the recording medium 2. Concurrently, the second delay circuit 55 is arranged to produce an output signal after the time required for the completion of the operation of the stepping motor 10. This output signal is applied to the reset input of the flip flop 56 to reset the flip flop 56 to provide a 0 output signal. The 0 output signal from the flip-flop 56 is applied to the first multivibrator circuit 57 to produce a control signal for energizing the solenoid 34 and through the third delay 58 to the input of the second multivibrator circuit 59 to produce a timing signal for the print select circuit 40 to control the printing of the digital character selected by the digital input signal applied to the input terminals 42. Thus, the control signal for the solenoid 34 is produced before the timing signal for the print select circuit 40 as a result of the added signal delay interposed by the third delay 58, i.e., the first multivibrator 57 is triggered before the second multivibrator 59. As a result, the digital print head 30 is driven into a print position against the recording medium 2 by the solenoid 34 before an energization signal from the print select circuit 40 is applied to the print head 40 to selectively produce a thermal pattern. Subsequently, the duration of the print select timing signal is preselected by a design of the operation of the second multivibrator 59 to be shorter than the duration of the output signal from the first multivibrator 57 applied to the solenoid 34. The duration of the solenoid energizing signal is preselected to produce an operation of the solenoid 34 suitable for producing a thermal recording on the recording medium 2 in combination with the print timing signal supplied to the print select circuit 40.

The occurrence of the next output signal from the counter 54 is effective to set the flip flop 56 to its 1 state and to apply a new input signal to the first delay circuit 50. When the next input signal to the delay circuit 50 emerges from the delay circuit 50, it is applied to the motor 10 to produce an incremental step movement of the motor 10 and to the input of the second delay circuit 55. The output of the second delay circuit 55 is connected to the reset input of the flip flop 56 to reset the flip flop 56 into the 0 state. This change of the state of the flip flop 56 is applied to the first multivibrator trigger circuit 57 and through a third delay 57 to the second multivibrator trigger circuit 58. The further operation of the circuit of FIG. 2 is a repetition of the printing cycle described above. Thus, the sequential operation of the motor 10 and the print select circuit 40 in combination with the solenoid 34 is achieved to produce printing of the digital character during the interval between incremental steps of the recording medium 2.

Accordingly, it may be seen that there has been provided, in accordance with the present invention, a thermal recorder having analog and digital recording heads for concurrently producing analog and digital recordings on an intermittently moving thermally responsive recording medium.

The embodiments of the invention in which an exclusive property or privilege is claimed are defined as follows:

1. A recorder for recording on a recording medium comprising a print head including selectively energizable means for producing a character representative pattern for affecting the recording medium, stepping motor means for intermittently driving the recording medium past said print head, said intermittent drive producing incremental steps of the recording medium with each incremental step being less than the length along the recording medium of a character to be printed by said print head, print means connected to said print head and responsive to an input signal and an energization signal for selectively energizing said selectively energizable means to produce said pattern for printing on the recording medium, control means connected to said motor means for intermittently energizing said motor means and to said print means and responsive to said energization of said motor means to produce said energization signal to control the energization of said print means between the intermittent operations of said motor means whereby each character is printed over a plurality of intermittent operations of said motor means, and analog recording means continuously in contact with the recording medium and arranged to be energized by an analog input signal to record the analog input signal on the recording medium.

2. A recorder as set forth in claim 1 and further including a solenoid means for selectively urging said print head against a recording medium responsive to said pattern and wherein said control means is connected to said solenoid means to produce an energization of said solenoid means between energizations of said motor means and said print means during the energization of said solenoid means.

3. A recorder as set forth in claim 2 wherein the energization of said solenoid means by said control means is a longer duration event than the energization of said print means.

4. A recorder as set forth in claim 2 wherein said solenoid means includes means for returning said print head to a position spaced from of said recording medium following a termination of the energization of said solenoid means by said control means.

5. A recorder as set forth in claim 1 wherein said selectively energizable means is arranged to produce a thermal pattern.

6. A recorder as set forth in claim 1 wherein said print head is a digital print head.

7. A recorder as set forth in claim 6 wherein said selectively energizable means in said print head is arranged to produce a thermal pattern.

* * * * *